(12) United States Patent
Kimura (10) Patent No.: US 8,042,152 B2
(45) Date of Patent: Oct. 18, 2011

(54) HOME NETWORK SYSTEM (75) Inventor: Nobuyuki Kimura, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 910 days.

(21) Appl. No.: 11/387,983

(22) Filed: Mar. 24, 2006

(65) Prior Publication Data

US 2006/0218622 A1 Sep. 28, 2006

(30) Foreign Application Priority Data

Mar. 25, 2005 (JP) ................. 2005-087798

(51) Int. Cl.
*H04L 29/00* (2006.01)
(52) U.S. Cl. .......................... 726/2; 726/38
(58) Field of Classification Search ............. 725/38; 704/275; 726/2, 38
See application file for complete search history.

(56) References Cited

U.S. PATENT DOCUMENTS

| | | | | |
|---|---|---|---|---|
| 6,018,690 | A * | 1/2000 | Saito et al. ............... | 700/295 |
| 6,288,716 | B1 * | 9/2001 | Humpleman et al. ....... | 715/733 |
| 6,735,619 | B1 * | 5/2004 | Sawada ................... | 709/212 |
| 2001/0049729 | A1 * | 12/2001 | Carolan et al. ............ | 709/220 |
| 2001/0054070 | A1 * | 12/2001 | Savage et al. ............. | 709/204 |
| 2003/0004834 | A1 * | 1/2003 | Yamazaki ................. | 705/26 |
| 2003/0092395 | A1 | 5/2003 | Gassho et al. | |
| 2004/0093219 | A1 * | 5/2004 | Shin et al. ................ | 704/275 |
| 2005/0183115 | A1 * | 8/2005 | Maruyama et al. ........ | 725/38 |

FOREIGN PATENT DOCUMENTS

| | | |
|---|---|---|
| JP | 2003-9265 A | 1/2003 |
| JP | 2003-152735 A | 5/2003 |
| JP | 2003-309882 A | 10/2003 |
| WO | WO 03/092269 A1 | 11/2003 |

OTHER PUBLICATIONS

Japanese Office Action dated Oct. 7, 2008 w/English translation (five (5) pages).

* cited by examiner

*Primary Examiner* — Nasser Moazzami
*Assistant Examiner* — Ghazal Shehni
(74) *Attorney, Agent, or Firm* — Crowell & Moring LLP

(57) ABSTRACT

A home network system including a server apparatus and an apparatus, which are capable of communicating therebetween, each of which has an authentication ID control unit equipped with an authentication ID storage unit for storing an authentication ID given from an authentication ID giving unit. Connection between the server apparatus and the client apparatus is established by the authentication ID control unit when the given authentication IDs match with each other, wherein the authentication ID giving unit includes a remote control unit capable of communicating with the server apparatus and the client apparatus by using an infrared ray and gives an identical authentication ID to the server apparatus or the client apparatus on the basis of a predetermined input operation.

7 Claims, 5 Drawing Sheets

FIG1

HOME NETWORK SYSTEM

BACKGROUND OF THE INVENTION

1. Field of the Invention

The present invention relates to a home network system capable of transmitting digital video data and the like through a radio transmission channel, particularly to a technique for readily integrating a server apparatus and client apparatuses, which are connected to a network, into a group and setting the security thereof.

2. Description of Related Art

Recently, DVD/HDD recorders and personal computers, which are provided with personal video recorder (PVR) functions, have remarkably prevailed. Accompanying this, video resources which allow individuals viewing and listening thereto at home, has also continually been growing. Such contents as video information which are accumulated in a DVD/HDD recorder or personal computer, are required for users to enjoy anytime and anywhere. A technique which is capable of outputting the contents on a client apparatus such as a liquid crystal TV or the like, by using a home network, has been proposed. As a technique for transmitting a large amount of data such as video data and sound data at a high speed and in real time, for example, IEEE 1394 is adopted as a connecting interface for digital TV, digital video recorder or the like.

In these days, to readily connect devices, the DVD/HDD recorder, personal computer, liquid crystal monitor and the like are configured to be connected to one another by using a wireless LAN. As a typical technique of the wireless LAN, IEEE 802.11 using a 2.4 GHz waveband, which was standardized by the IEEE, has widely prevailed. The 2.4 GHz waveband is called as industrial, scientific and medical (ISM) band, which is a frequency band used for the purposes of industry, medical field, microwave oven or the like. In Japan, a waveband of 2.400 to 2.497 GHz is allotted for the wireless LAN.

However, in the home network system, when a communication is carried out by utilizing a radio transmission channel, for example, there is a problem of security such that devices within the home network may be accessed and controlled through an external communication device. Therefore, it is important to carry out an authentication operation before establishing the connection among the devices within the home network. As an authentication operation, the following methods are available. That is, authentication IDs of the respective devices which are connected with each other, are exchanged, and only when the respective authentication IDs match with each other, the communication can be started.

For example, JP 2003-309882A (Patent document 1) discloses a home network system in which a home server and a home electric appliance (white goods, e.g., a refrigerator, an air conditioner, an electric washing machine, an electric rice cooker, a microwave and the like) are connected to each other through electric cables. In order to control the electric appliance within the home network with one remote control unit, the home server is configured so that once a user sets up an authentication ID of the remote control unit to the home server, the home server automatically transmits the authentication ID of the remote controller, which has been set up therein, to the respective electric appliances. Accordingly, the authentication ID of the remote control unit does not have to be set up to each of the electric appliances, thus the user is relieved of such load.

As another example of the home network system, JP 2003-9265A (Patent document 2) discloses the following remote control system. That is, only a terminal at the remote control side or only the side to be remote controlled can be replaced, and a plurality of devices which are manufactured by different makers, are remote-controllable from an identical terminal.

In the technique disclosed in Patent document 1, a server apparatus (home server) and a client apparatus (electric appliance) are connected into a group through a wire. In comparison with to the case of communication through a radio transmission channel, the security between the server apparatus and the client apparatus is ensured at a high level, and by carrying out the authentication among the server apparatus, the client apparatus and the remote control unit, the security can be increased.

On the contrary, in the case where the communication is carried out through a radio transmission channel between the server apparatus and the client apparatus, the authentication is required even between the server apparatus and the client apparatus. If the authentication is not carried out between the server apparatus and the client apparatus, data may be erroneously transmitted to an external radio communication device, or conversely, electric appliances within the home network may be controlled through an external radio communication device; thus the security thereof is reduced accordingly. For example, when a system is configured so that a server apparatus and a client apparatus which are located adjacent to each other, automatically recognize each other, there is such a possibility that the system might recognize a similar system used by another person being partitioned by a wall.

SUMMARY OF THE INVENTION

Accordingly, an object of the present invention is to provide a home network system capable of communicating between a server apparatus and client apparatuses through a radio transmission channel, in which the communication is allowed between the devices having an identical authentication ID, and the authentication ID can be set up with a simple input operation; thereby the security thereof is increased.

In order to achieve the above-described object, the present invention has been carried out. In accordance with one aspect of the invention, the home network system comprises a server apparatus and one or more client apparatuses, which are capable of communicating therebetween through a transmission channel, each of the server apparatus and the one or more client apparatuses having an authentication ID control unit equipped with an authentication ID storage unit for storing an authentication ID given from an authentication ID giving unit, the home network system being configured so that a connection with each other is established by the authentication ID control unit when the respective authentication IDs match with each other, wherein the authentication ID giving unit includes a remote control unit capable of communicating with the server apparatus and the one or more client apparatuses by using an infrared ray and gives identical authentication ID to the server apparatus or the one or more client apparatuses based on a predetermined input operation. In particular, the invention is effective in a home network system which is constructed through a radio transmission channel.

According to the home network system of the invention having such a configuration, since the authentication ID giving unit includes a remote control unit capable of communicating with the server apparatus and the one or more client apparatuses by using an infrared ray and gives identical authentication ID to the server apparatus or the one or more client apparatuses based on a predetermined input operation, the server apparatus and the client apparatus constituting the home network can be integrated into a group with a simple input operation, and thereby the security thereof can be increased.

In the system, preferably, the remote control unit, the server apparatus and the client apparatuses communicate with one another by using an infrared ray, and an authentication ID can be received only by a client apparatus which can receive the infrared ray.

According to the home network system of the invention having such a configuration, the authentication ID can be prevented from being erroneously given to an external radio communication device, which should not be included in the group, from the remote control unit.

Preferably, when the authentication ID is given by the authentication ID giving unit, the server apparatus stores the given authentication ID in the server side authentication ID storage unit, and searches the client apparatuses having an authentication ID identical to the authentication ID and to transmit connection information and security information to the relevant client apparatuses.

On the other hand, when the authentication ID is given by the authentication ID giving unit, the client apparatuses store the given authentication ID in the client side authentication ID storage unit, and search the server apparatus having an authentication ID identical to authentication ID and receives the connection information and the security information from the relevant server apparatus to set up the information therein.

When the authentication ID is given by the authentication ID giving unit, the server apparatus stores the given authentication ID in server side authentication ID storage unit, searches the one or more client apparatuses having the authentication ID identical to the authentication ID and transmits connection information and security information to relevant the one or more client apparatuses, when the authentication ID is given by the authentication ID giving unit, the one or more client apparatuses store the given authentication ID in client side authentication ID storage unit, searches the server apparatus having an authentication ID identical to the authentication ID and receives the connection information and the security information from relevant the server apparatus to set up the information therein. According to the home network system having such a configuration, the server apparatus and the client apparatus, which have been integrated into a group, can be automatically connected with each other, and thus the user is relieved of such load.

DETAILED DESCRIPTION OF THE PREFERRED EMBODIMENTS

Hereinafter, preferred embodiments of the present invention will be described with reference to the drawings.

Figure 1:
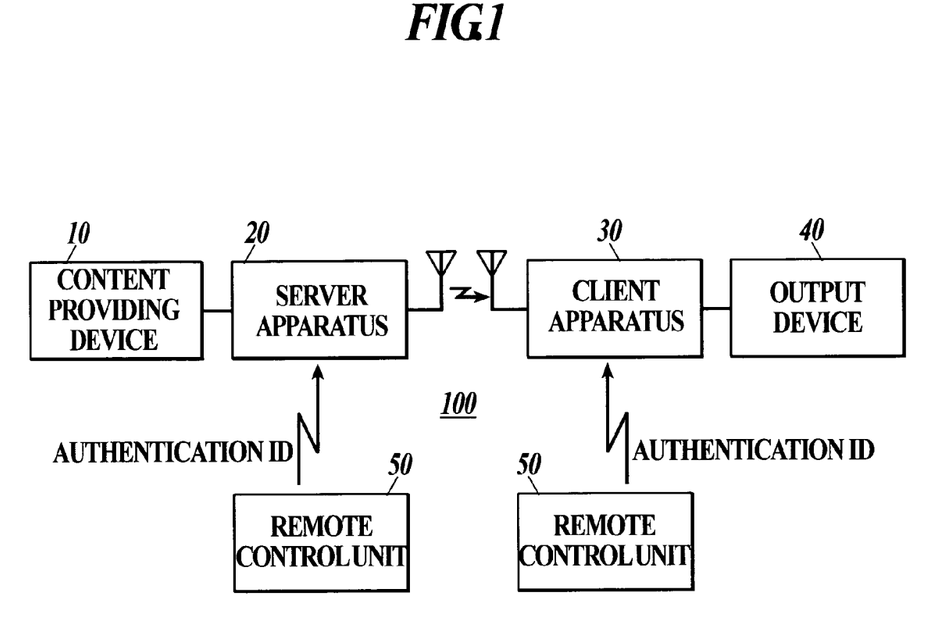
FIG. 1 schematically illustrates the configuration of a home network system in accordance with an embodiment of the present invention.

FIG. 1 schematically illustrates the configuration of a home network system according to the invention.

A home network system 100 according to the invention is a so-called AV home network system which includes a content providing device 10 for providing contents (analog data or digital data) including video data and sound data, a server apparatus 20, a client apparatus 30 and an output device 40 such as a liquid crystal monitor, speaker or the like. Here, the content providing device 10 includes, for example, a DVD/HDD recorder, a video tape recorder, a receiver for analog or digital TV broadcasting and the like.

In the home network system 100 according to the present invention, for example, the content providing device 10 and the transmitting device 20, and the receiving device 30 and the output device 40 are connected to each other with a cable or the like conforming to IEEE 1394; and between the transmitting device 20 and the receiving device 30, data transmission is carried out using a wireless LAN conforming to IEEE 802.11g. Further, the server apparatus 20 and the client apparatus 30 are configured to be controllable through a remote control unit 50.

The content providing device 10 includes an AV data generating unit (not shown), and thereby reads out a content (video data, sound data) from a recording medium such as a DVD, video cassette tape, hard disk or the like; or receives digital or analog TV broadcasting, and outputs the content or TV broadcasting as AV data after converting the same into a predetermined format. The AV data outputted from the content providing device 10 are analog data or digital data depending on the kind of the media and/or function of the content providing device 10.

Figure 2:
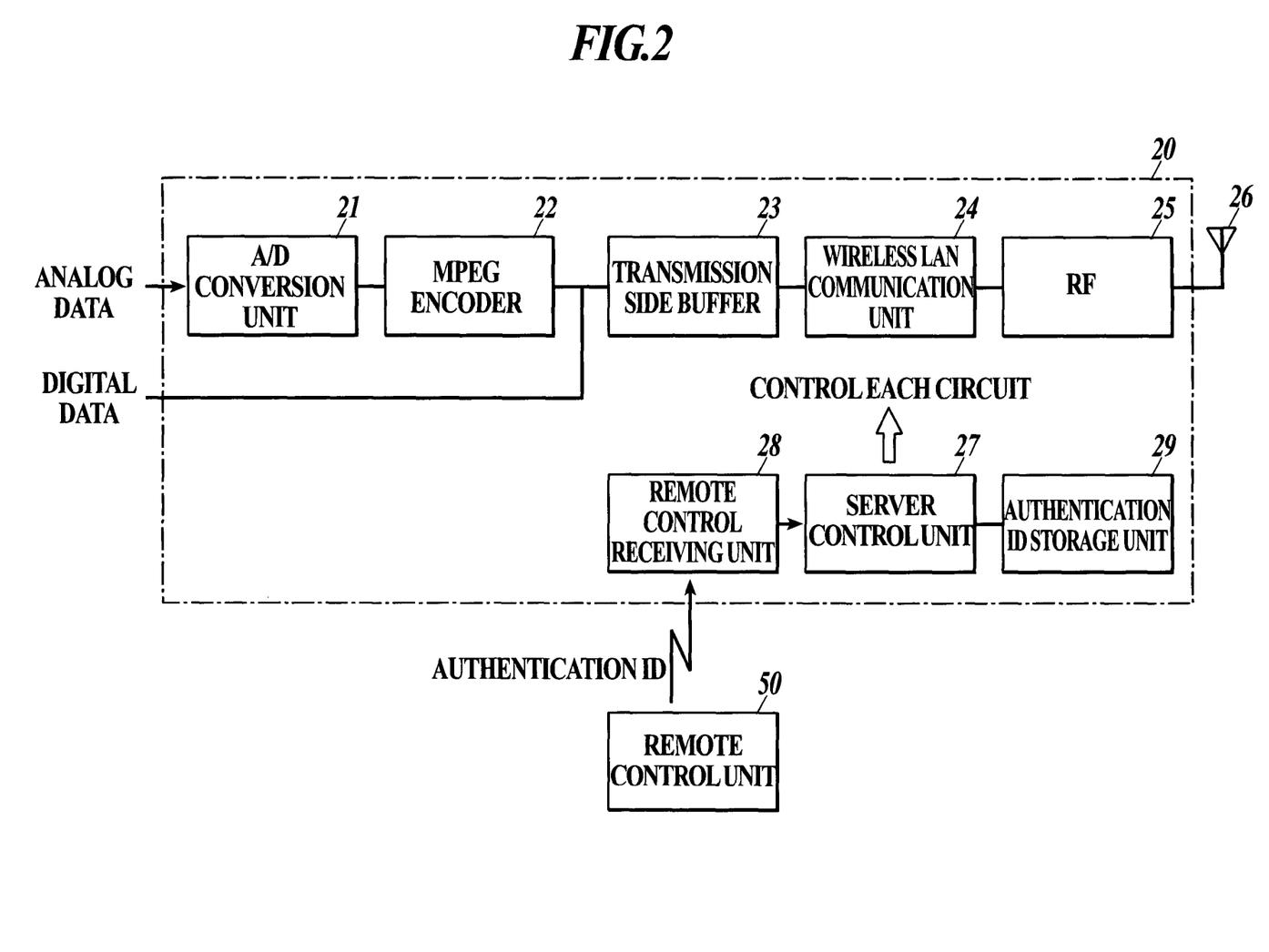
FIG. 2 schematically illustrates the configuration of a server apparatus 20.

FIG. 2 schematically illustrates a configuration of a server apparatus 20. As shown in FIG. 2, the server apparatus 20 includes an A/D conversion unit 21, an MPEG encoder 22, a transmission side buffer 23, a wireless LAN communication unit 24, a radio frequency (RF) amplifier 25, an antenna 26, a server control unit 27, a remote control receiving unit 28 and an authentication ID storage unit 29. The server apparatus 20 transmits AV data supplied from the content providing device 10 to the receiving device 30 in a digital format conforming to, for example, MPEG 2.

The A/D conversion unit 21 converts analog AV data transmitted from the content providing device 10 into digital data. The MPEG encoder 22 packs and encodes the digital AV data supplied from the A/D conversion unit 21 in accordance with the MPEG 2 format.

When the AV data supplied from the content providing device 10 is the digital AV data, the A/D conversion unit 21 and the MPEG encoder 22 are not used.

The transmission side buffer 23 stores the supplied digital AV data. The wireless LAN communication unit 24 performs protocol processing and modulation/demodulation processing on the digital AV data outputted from the transmission side buffer 23. The radio frequency amplifier 25 amplifies RF signals into radio frequency waves and transmits the same to the client apparatus 30 through the antenna 26. For example, the RF signals are transmitted through a communication channel of which center frequency is within a frequency band of 2.412 GHz.

The remote control receiving unit 28 receives infrared signals from the remote control unit 50. For example, the remote control receiving unit 28 receives an authentication ID (for example, arbitrary ID code different from a remote control code relevant to device control) from the remote control unit 50 and supplies the authentication ID to the server control unit 27.

The server control unit 27 includes a CPU, a RAM and a ROM (which are not shown in the figures). The ROM stores various control programs. The CPU utilizes the RAM as the operation area to operate in accordance with the control programs in the ROM. For example, when the authentication ID is supplied from the remote control receiving unit 28, the authentication ID is registered in the authentication ID storage unit 29; and when the authentication ID agrees with the authentication ID of the client apparatus 30, the connection therebetween is established (authentication ID control unit). Further, client apparatus within the same group having the identical authentication ID is searched and connection information and security information are automatically transmitted thereto.

Here, the authentication ID from the remote control unit 50 may be set up by, for example, pushing a single or plural buttons of the remote control unit 50. Also, the server apparatus 20 is configured so that the authentication ID registered in the authentication ID storage unit 29 is not deleted unless a specific operation like a system reset is made on the server apparatus 20. Owing to this, the user has to simply carry out the registration operation of the authentication ID only one time, for example, after purchasing the server apparatus 20.

Figure 3:
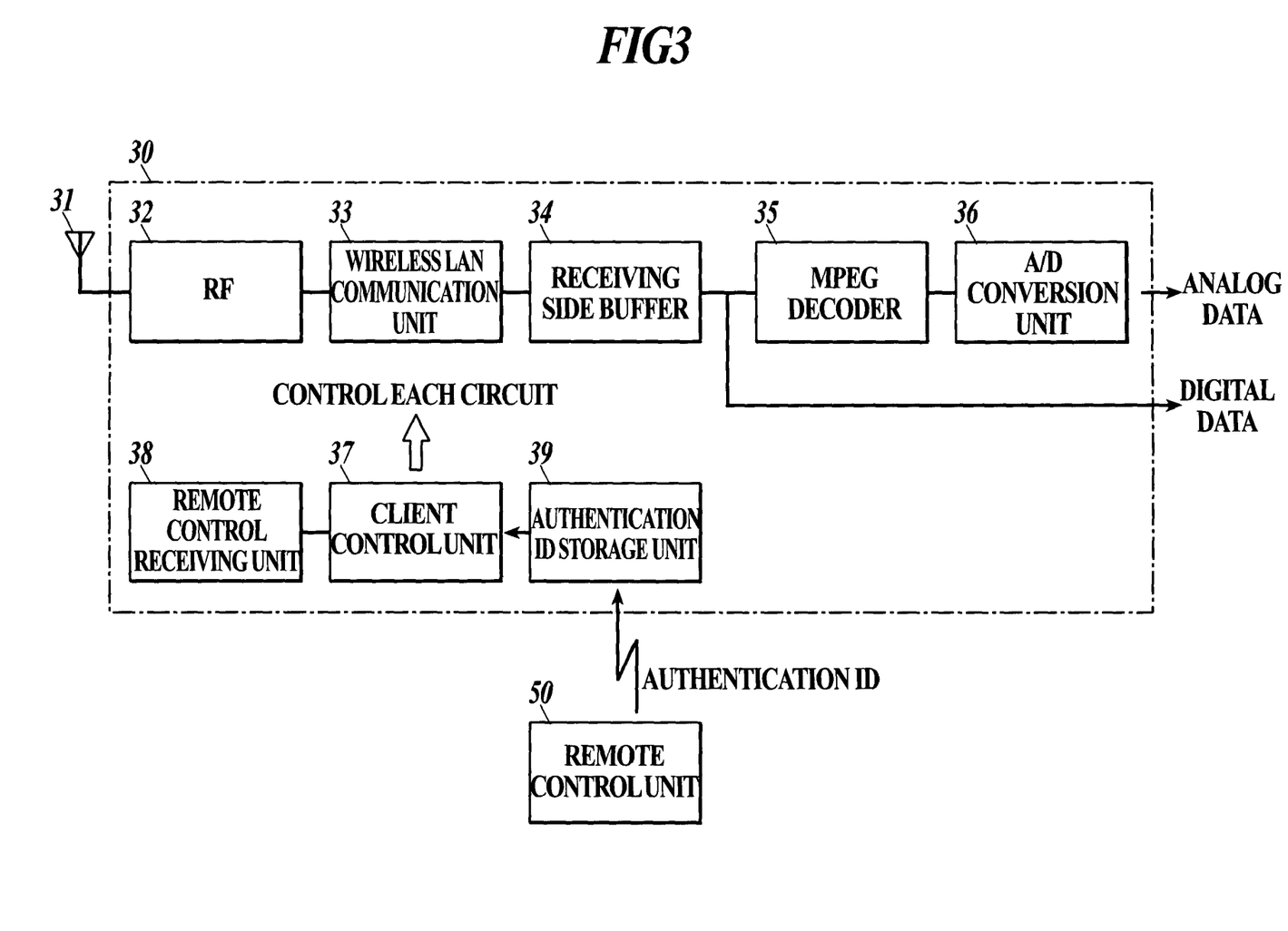
FIG. 3 schematically illustrates the configuration of a client apparatus 30.

FIG. 3 schematically illustrates the configuration of a client apparatus 30. As shown in FIG. 3, the client apparatus 30 includes an antenna 31, a radio frequency amplifier (RF) 32, a wireless LAN communication unit 33, a receiving side buffer 34, an MPEG decoder 35, a D/A conversion unit 36, a client control unit 37, a remote control receiving unit 38 and an authentication ID storage unit 39. The client apparatus 30 receives digital AV data transmitted from the server apparatus 20 and outputs the same to the output device 40.

The antenna 31 receives RF signals transmitted from the server apparatus 20 through a communication channel, and supplies the received RF signals to the radio frequency amplifier 32. The radio frequency amplifier 32 amplifies the RF signals received through the antenna 31 into radio frequency waves and supplies the same to the wireless LAN communication unit 33. The wireless LAN communication unit 33 performs protocol processing and modulation/demodulation processing on the digital AV data supplied from the radio frequency amplifier 32. The receiving side buffer 34 stores the digital video data supplied from the wireless LAN communication unit 33 in order.

The MPEG decoder 35 unpacks and decodes the digital AV data supplied from the receiving side buffer 34 to generate digital AV data. The D/A conversion unit 36 converts the digital AV data supplied from the MPEG decoder 35 into analog AV data and outputs the same to the output device 40. When the output device 40 is capable of regenerating digital AV data, the MPEG decoder 35 and the D/A conversion unit 36 are not used.

The remote control receiving unit 38 receives infrared signals from the remote control unit 50. For example, the remote control receiving unit 38 receives an authentication ID (an arbitrary ID code different from, for example, a remote control code relevant to the device control) from the remote control unit 50 and supplies the same to the client control unit 37.

The client control unit 37 includes a CPU, a RAM and a ROM (which are not shown in the figures). The ROM stores various control programs; the CPU utilizes the RAM as the operation area and operates in accordance with the control programs within the ROM. For example, when an authentication ID is supplied from the remote control receiving unit 38, the client control unit 37 registers the authentication ID to the authentication ID storage unit 39, and when the authentication ID agrees with the authentication ID of the server apparatus 20, the connection therebetween is established (authentication ID management unit). Also, the client control unit 37 searches server apparatus in the same group that have the identical authentication ID and requests the server apparatus 20 to issue connection information and security information; receives the connection information and the security information transmitted from the server apparatus 20 to set up the same therein.

Here, the remote control unit 50 may be configured so that the authentication ID from the remote control unit 50 is set up, for example, by pushing one or plural buttons of the remote control unit 50. Also, the authentication ID storage unit 39 is configured so that the authentication ID registered therein is not deleted unless a specific operation like a system reset is made on the client apparatus 30. Owing to this, it is necessary for the user to simply carry out the registration operation of the authentication ID only one time, for example, after the client apparatus 30 is purchased.

As described above, in the home network system 100 according to the present invention, the server apparatus 20 and the client apparatus 30 constituting the home network can be integrated into a group by simply carrying out the input operation through the remote control unit 50, and thereby external communication devices, which are not set up with identical authentication ID, can be excluded from the network. Accordingly, the security is largely increased.

The remote control unit 50, the server apparatus 20 and the client apparatus 30 are configured to communicate with each other using an infrared ray. Accordingly, the authentication ID is prevented from being erroneously given to external radio communication devices, which should not be included in the group, from the remote control unit.

It is desired that the remote control unit 50 be manufactured as a set with, for example, the server apparatus 20 and distributed and sold accompanying the server apparatus 20. In this case, the authentication ID to be given by the remote control unit 50 may be previously registered in the server apparatus 20. By adopting the above mode, even when a client apparatus 30 is newly added, the client apparatus 30 can be readily included in the group by simply giving the authentication ID to the added client apparatus 30 through the remote control unit 50 accompanying the server apparatus 20.

Figure 4:
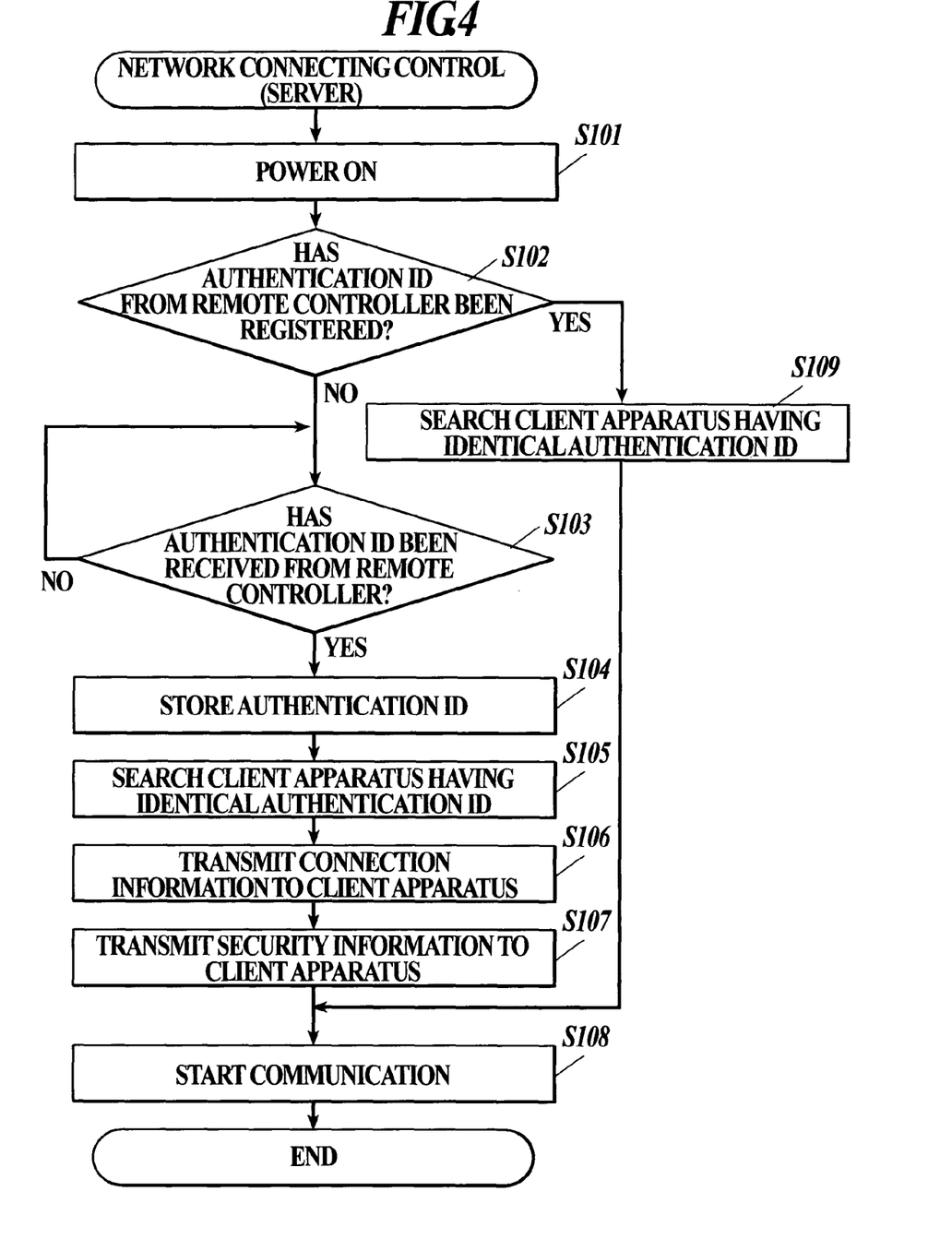
FIG. 4 is a flowchart of a network connecting process in the server apparatus 20.

FIG. 4 illustrates a flowchart of a network connecting process in the server apparatus 20. In this network connecting process, the server control unit 27 in the server apparatus 20 executes the control programs to control the respective circuits in accordance with the control programs.

First of all, when the power supply of the server apparatus 20 is turned ON in step S101, the authentication ID is given by the remote control unit 50, and it is determined whether or not the authentication ID has been registered in the authentication ID storage unit 29 in step S102. When it is determined that the authentication ID from the remote control unit 50 has been registered in step S102, the client apparatuses having the identical authentication ID are searched (step S109). And when there is any client apparatus having the identical authentication ID, the communication with the client apparatus is allowed to start (step S108).

On the other hand, when it is determined that the authentication ID has not been given by the remote control unit 50 (for example, immediately after the server apparatus is purchased or the like) in step S102, the server apparatus 20 waits until the authentication ID is given from the remote control unit 50 (step S103). And when the authentication ID transmitted from the remote control unit 50 is received, the authentication ID is registered in the authentication ID storage unit 29 (step S104).

Then, the client apparatus having the identical authentication ID is searched (step S105). When a client apparatus having the identical authentication ID is detected, connection information is transmitted to the client apparatus (step S106), and security information such as a cryptographic key is transmitted (step S107). Then, the communication with the client apparatus is allowed to start (step S108).

Figure 5:
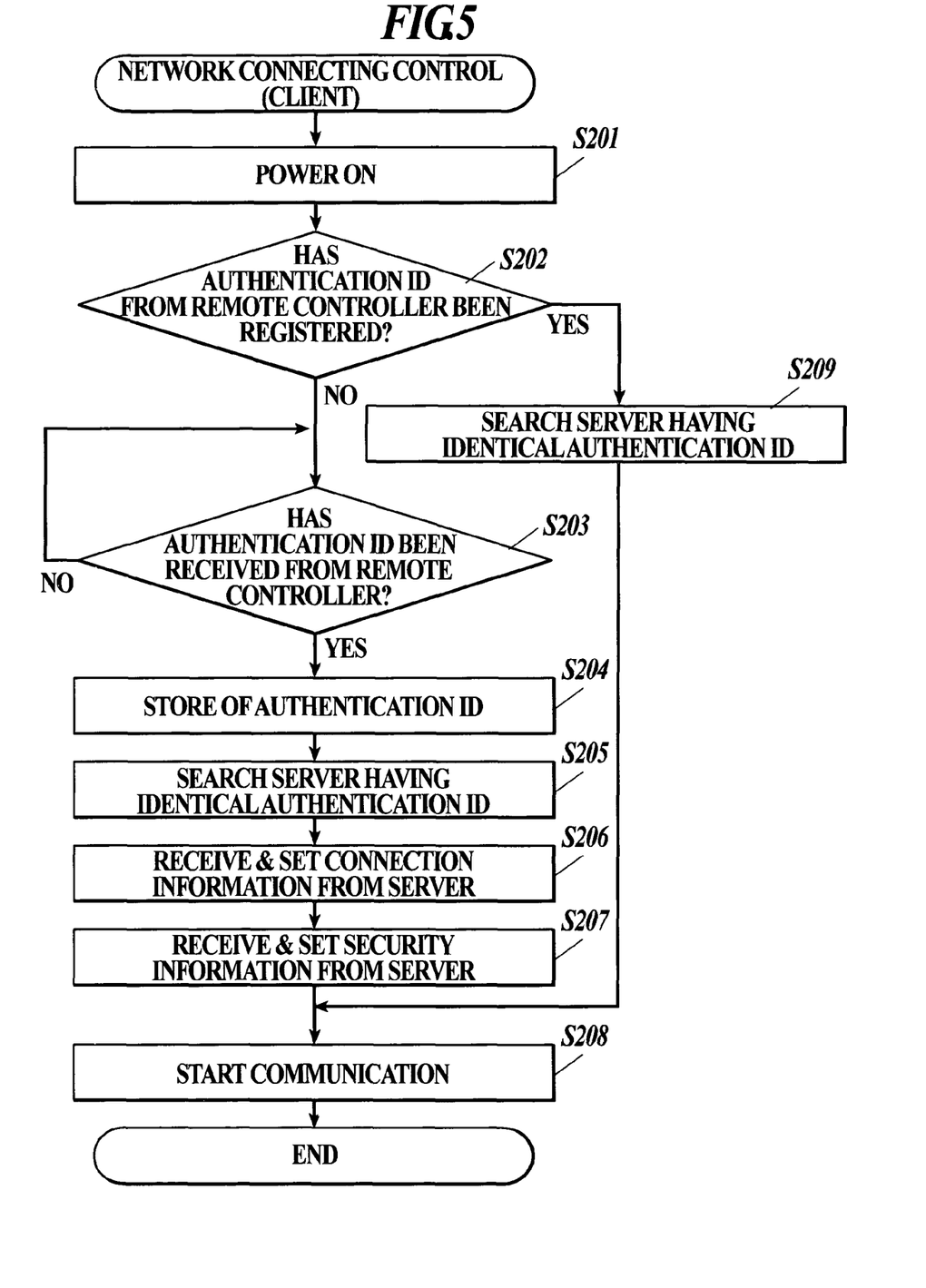
FIG. 5 is a flowchart of a network connecting process in the client apparatus 30.

FIG. 5 illustrates a flowchart of a network connecting process in the client apparatus 30. In the network connecting process, the client control unit 37 of the client apparatus 30 executes the control programs to control the respective circuits in accordance therewith.

First of all, when the power supply of a client apparatus 30 is turned ON in step S201, the authentication ID is given to the client apparatus 30 from the remote control unit 50, and it is determined whether the authentication ID has been registered in the authentication ID storage unit 39 in step S202. When it is determined that the authentication ID from the remote control unit 50 has been registered in step S202, the server apparatus having the identical authentication ID is searched (step S209). And when the server apparatus having the identical authentication ID is detected, the communication with the server apparatus is allowed to start (step S208).

On the other hand, when it is determined that the authentication ID is not given from the remote control unit 50 (for example, immediately after the client apparatus is purchased) in step S202, the client apparatus 30 waits until the authentication ID is given from the remote control unit 50 (step S203). And when the authentication ID transmitted from the remote control unit 50 is received, the authentication ID is registered in the authentication ID storage unit 39 (step S204).

Then, the server apparatus having the identical authentication ID is searched (step S205). And when the server apparatus having the identical authentication ID is detected, the client apparatus 30 issues a request to the server apparatus to transmit connection information, and security information transmitted corresponding to the request are set up (step S206 and S207). Then the communication with the server apparatus is allowed to start (step S208).

As described above, the server apparatus 20 is configured so as, when the authentication ID is given from the remote control unit 50, to store the given authentication ID in the authentication ID storage unit 29; to search the client apparatus having the authentication ID identical thereto; and to transmit the connection information and the security information to the relevant client apparatus. On the other hand, the client apparatus 30 is configured so as, when the authentication ID is given from the remote control unit 50, to store the given authentication ID in the authentication ID storage unit 39; to search the server apparatus having the authentication ID identical thereto; and to receive the connection information and the security information from the relevant server apparatus and to set up the same therein. Accordingly, the server apparatus and the client apparatus within the group are automatically connected. Owing to this, the user does not have to set up the connection information and the like; thus the load on the user is largely reduced.

The invention made by the inventor has been described above in particular based on the embodiment. However, the present invention is not limited to the above-described embodiment but various modifications are possible within a range of the spirit thereof without departing therefrom.

For example, in the above-described embodiment, an example, in which the home network system is built using a wireless LAN of 2.4 GHz band prescribed by the IEEE 802.11g, has been described. However, the present invention is applicable to a home network system using another radio transmission technology. For example, a wireless LAN of 5.2 GHz band prescribed by the IEEE 802.11a, a wireless LAN of 2.4 GHz band prescribed by the IEEE 802.11b, an optical wireless LAN and the like are available.

Further, in the above-described embodiments, the server apparatus 20 and the content providing device 10 may be integrated with each other; and the client apparatus 30 and the output device 40 may be integrated with each other.

Furthermore, in the above-described embodiments, a configuration in which the authentication ID is given through the remote control unit 50, which is provided as an accessory of the server apparatus 20, is adopted. However, a remote control unit for giving the authentication ID only, is independent from the control operation of the server apparatus 20 and the client apparatus 30, may be provided.

Still further, the present invention is applicable not only to AV home network system but also to a home network system of white goods (refrigerator, washing machine, air conditioner and the like) and a home network system of personal computers.

Still furthermore, in the above-described embodiments, a configuration, in which one server apparatus 20 and one client apparatus 30 are coupled with each other, has been described. However, the home network may be such configured that plural client apparatuses are connected to a server apparatus. In this case, a client apparatus can be readily added into a group by simply giving the authentication ID to the added client apparatus through the same remote control unit 50.

The entire disclosure of Japanese Patent Application No. Tokugan 2005-087798 filed on Mar. 25, 2005, including specification, claims, drawings and summary are incorporated herein by reference in its entirety.

What is claimed is:

1. A home network system comprising a server apparatus and one or more client apparatuses, which are capable of communicating therebetween through a transmission channel, each of the server apparatus and the one or more client apparatuses including a control unit having an authentication ID control unit equipped with an authentication ID storage unit for storing an authentication ID given from an authentication ID giving unit, the home network system being configured so that a connection between the server apparatus and the one or more client apparatuses is established by the authentication ID control unit when the given authentication IDs of the server apparatus and the one or more client apparatuses match with each other, wherein the control unit of the server apparatus originally stores connection information and security information, wherein the authentication ID giving unit includes a remote control unit capable of communicating with the server apparatus and the one or more client apparatuses by using an infrared ray, and giving an identical authentication ID to the server apparatus and/or the one or more client apparatuses on the basis of a predetermined input operation, wherein, when the authentication ID is given by the authentication ID giving unit, the server apparatus stores the given authentication ID in the authentication ID storage unit of the server apparatus, and the control unit of the server apparatus searches for the one or more client apparatuses having the authentication ID identical to the authentication ID stored in the server apparatus and, when the one or more client apparatuses having the identical authentication ID are found, automatically transmits the connection information and the security information from the control unit of the server apparatus to the one or more client apparatuses having the identical authentication ID, wherein, when the authentication ID is given by the authentication ID giving unit, the one or more client apparatuses store the given authentication ID in the authentication ID storage unit of each of the one or more client apparatuses, search for the server apparatus having the authentication ID identical to the authentication ID stored in the one or more client apparatuses, and request and receive the connection information and the security information from the server apparatus having the identical authentication ID to set up the connection information and the security information therein, and wherein the authentication IDs stored in the respective authentication ID storage units are not deleted unless a specific operation is made.

2. The home network system of claim 1, wherein the server apparatus and the client apparatuses in the same group that have the identical authentication ID are automatically connected, and the connection information and the security information are automatically transmitted to the client apparatuses from the server apparatus.

3. The home network system of claim 1, wherein, the server apparatus further includes a conversion unit to convert analog data into digital data to transmit the digital data from the server apparatus to the one or more client apparatuses, when the server apparatus receives the analog data from a content providing device, and when the server apparatus receives digital data from the content providing device, the conversion unit is not used.

4. A server apparatus comprising:

a communication unit that performs radio communication with one or more client apparatuses; and a control unit including an authentication ID control unit equipped with an authentication ID storage unit for storing an authentication ID, the server apparatus being configured so that a connection with the one or more client apparatuses is established by the authentication ID control unit when the authentication ID of the server apparatus matches an authentication ID of the one or more client apparatuses, wherein the control unit of the server apparatus originally stores connection information and security information, wherein the authentication ID control unit stores the authentication ID given from an authentication ID giving unit, including a remote control unit, in the authentication ID storage unit, wherein, when the authentication ID is given by the authentication ID giving unit, the server apparatus stores the given authentication ID in the authentication ID storage unit, and the control unit searches for the one or more client apparatuses having the authentication ID identical to the authentication ID stored in the server apparatus and, when the one or more client apparatuses having the identical authentication ID are found, automatically transmits the connection information and the security information from the control unit to the one or more client apparatuses having the identical authentication ID, and wherein the authentication ID stored in the authentication ID storage unit is not deleted unless a specific operation is made.

5. A client apparatus comprising:

a communication unit that performs radio communication with a server apparatus; and an authentication ID control unit equipped with an authentication ID storage unit for storing an authentication ID, the client apparatus being configured so that a connection with the server apparatus is established by the authentication ID control unit when the authentication ID of the client apparatus matches an authentication ID of the server apparatus, wherein a control unit of the server apparatus originally stores connection information and security information, wherein the authentication ID control unit stores the authentication ID given from an authentication ID giving unit, including a remote control unit, in the authentication ID storage unit, wherein, when the authentication ID is given by the authentication ID giving unit, the client apparatus stores the given authentication ID in the authentication ID storage unit, searches for the server apparatus having the authentication ID identical to the authentication ID stored in the client apparatus, and, when the server apparatus having the identical authentication ID is found, requests and receives the connection information and the security information stored in the control unit of the server apparatus from the server apparatus having the identical authentication ID to set up the connection information and the security information therein, wherein, the authentication ID stored in the authentication ID storage unit is not deleted unless a specific operation is made.

6. The server apparatus of claim 4, wherein the server apparatus and the client apparatuses in the same group that have the identical authentication ID are automatically connected, and the connection information and the security information are automatically transmitted to the client apparatuses from the server apparatus.

7. The client apparatus of claim 5, wherein the server apparatus and the client apparatus in the same group that have the identical authentication ID are automatically connected, and the connection information and the security information are automatically transmitted to the client apparatus from the server apparatus.

* * * * *